Nov. 15, 1938.                J. W. MORSE                2,136,633
                              BALANCE TESTER
                           Filed May 14, 1934          3 Sheets-Sheet 1
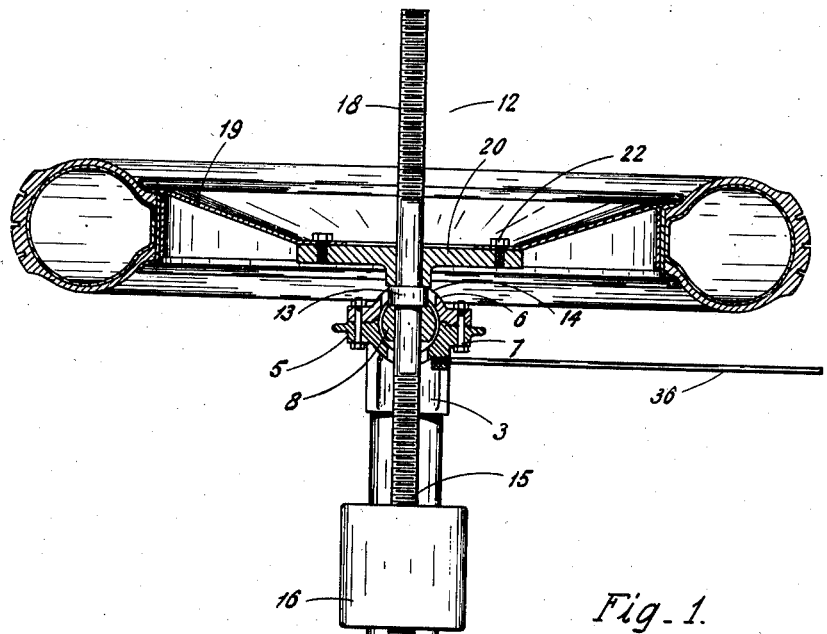
Fig. 1.
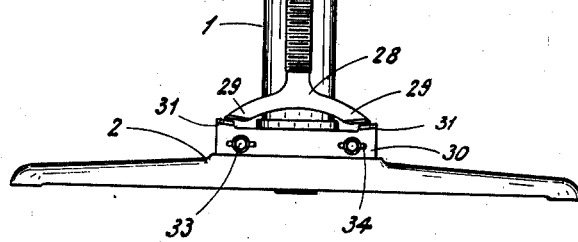
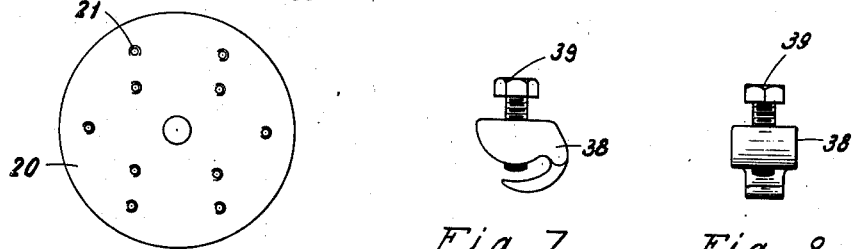
Fig. 6.       Fig. 7.       Fig. 8.
INVENTOR.
James. W. Morse.
BY Philip A. Minnis
ATTORNEY.

Nov. 15, 1938.  J. W. MORSE  2,136,633
BALANCE TESTER
Filed May 14, 1934   3 Sheets-Sheet 2

INVENTOR.
James W. Morse.
BY Philip A. Minnis
ATTORNEY.

Nov. 15, 1938.  J. W. MORSE  2,136,633
BALANCE TESTER
Filed May 14, 1934  3 Sheets-Sheet 3

INVENTOR.
James. W. Morse.
BY Philip A. Minnis
ATTORNEY.

Patented Nov. 15, 1938

2,136,633

UNITED STATES PATENT OFFICE 2,136,633

BALANCE TESTER

James W. Morse, Lansing, Mich., assignor to Food Machinery Corporation, San Jose, Calif., a corporation of Delaware Application May 14, 1934, Serial No. 725,422

3 Claims. (Cl. 73—51)

This invention relates to apparatus for testing vehicle wheels and the like for balance and run-out.

It is a matter of general knowledge that one or more warped or unbalanced wheels on a vehicle such as an automobile may not only result in excessive wear and strain on various parts of the vehicle, as well as discomfort to the occupants, but may be highly dangerous as well, due to the unbalanced forces set up by such wheel or wheels under rapid rotation. Among the most prominent effects may be mentioned the severe strain placed on the wheel bearings and supporting structure; excessive vibration to the vehicle; and wheel "shimmy" with consequent excessive wear on tires and interference with steering. Since the degree to which these effects are produced increases with the speed of the vehicle, it will be appreciated that even a single slightly unbalanced wheel may be highly undesirable or even dangerous if the vehicle be driven beyond a moderate rate of speed.

Present day automobile construction makes it increasingly important that the wheels be carefully and accurately balanced prior to being put into service. For example, the larger tires being used are more difficult to manufacture within close balance limits than the tires of smaller cross section such as heretofore used, and centrifuse brake drums are much heavier than the previously used pressed steel brake drums and, due to their construction, are frequently apt to be considerably out of balance. Such factors as these make wheel balancing imperative and, because of the higher speed capabilities of modern automobiles, accuracy of balance has become highly important. It is significant to note that in many cases manufacturers are recommending balance limits of less than half what was considered permissible a few years ago.

It will be understood that operating conditions may also require re-balancing of the wheels from time to time as, for example, when tires are replaced or repairs made to the wheels.

Such apparatus as has heretofore been available for testing the balance of vehicle wheels has generally proved insufficiently accurate for the purpose required, or has been excessively complicated and expensive and not adapted for sufficiently rapid manipulation for efficient operation under continuous use such as may be met with, for example, in manufacturing assembly lines or service stations.

The present invention has for its primary objects to provide a wheel balance testing device of improved construction and principle of operation; which is extremely sensitive and accurate in operation; which is adapted for easy and rapid manipulation; and is not only simple and inexpensive in construction but is unlikely to get out of order even under severe operating conditions.

It is also an object to provide associated mechanism in a device of this character for testing wheels for run-out in the same apparatus.

With these objects and advantages in view, as well as others which will hereinafter become more apparent, the invention will best be understood by reference to the ensuing detailed description taken in connection with the accompanying drawings, in which:

Figure 1 is a front elevation, partly in section, of a preferred form of apparatus embodying the principles of the invention, and illustrating a conventional automobile wheel in operative position thereon for testing.

Figure 6 is a plan view of an adapter plate used in mounting certain types of vehicle wheels in testing position on the apparatus.

Figure 7 is an end elevation of a balancing weight such as may be applied to a vehicle wheel to balance the same.

Figure 8 is a side elevation of the weight shown in Figure 7.

Figure 2:
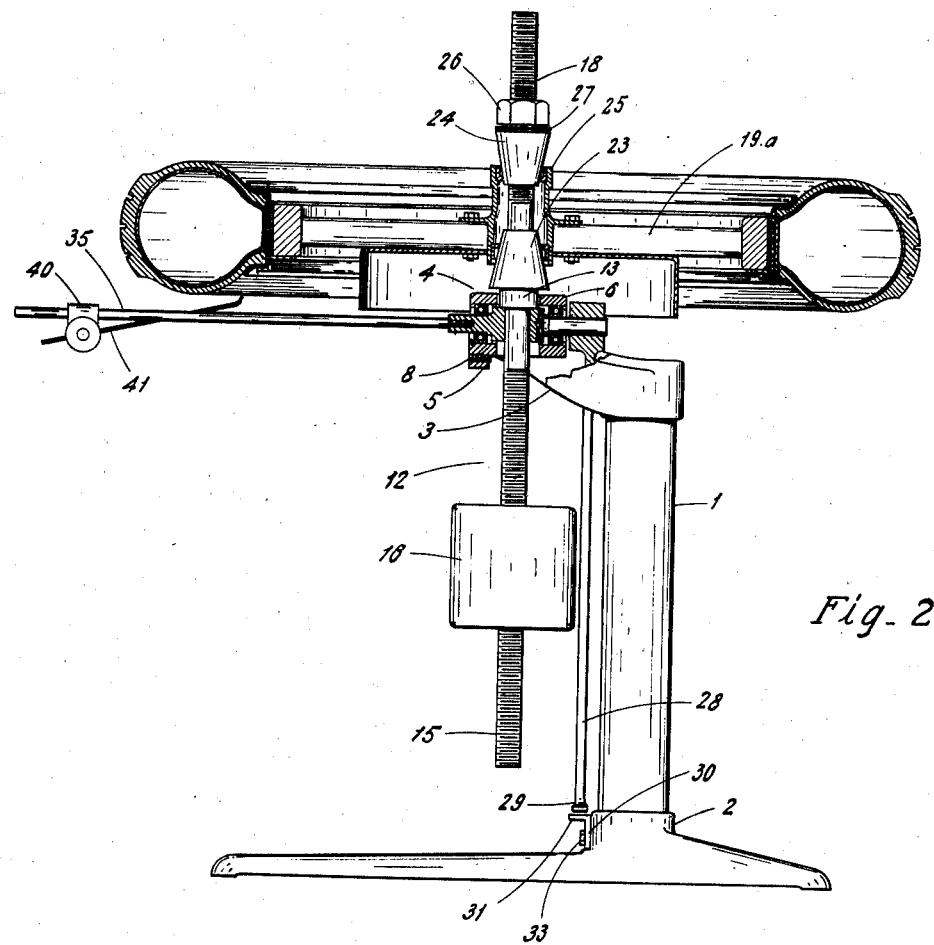
Figure 2 is a side elevation, partly in section, of the apparatus illustrated in Figure 1, but illustrating an alternative manner of mounting a different type of automobile wheel in testing position, and also illustrating the application of the run-out gauge.

The apparatus illustrated includes a vertical supporting standard 1 mounted upon a base or pedestal 2 and carrying at its upper end an overhanging bracket 3 which supports a split journal housing generally indicated at 4, including a lower section 5 formed integral with the bracket 3 and a separable cover section 6 removably secured to the lower section as by bolts 7.

Disposed within the journal housing 4 is a hub 8 rotatably journalled on ball bearings 9 by means of trunnions 10 provided with grooved rings 11 which cooperate with complementary grooved rings carried by the housing to form raceways for the ball bearings.

A normally vertical shaft generally indicated at 12 is pivotally supported intermediate its length for swinging movement about a horizontal axis by means of the hub 8 through which the shaft freely projects, and is supported in position by an annular shoulder 13 formed integral with the shaft and resting upon the hub 8. The upper and lower sections 5 and 6 of the housing 4 are provided with transversely extending slotted openings 14 to permit the shaft to project therethrough and to have swinging motion on the hub 4. The lower portion 15 of the shaft 12 projecting downwardly from the hub 4 forms a pendulum section which acts as a stabilizer for normally positioning the shaft in vertical position. A cylindrical counterpoise 16 is adjustably mounted thereon for adjustment toward and away from the pivotal point of the shaft. This may conveniently be accomplished by screw threading the shaft and providing the counterpoise with an axially tapped bore whereby it can be screwed up or down along the shaft.

The upper portion 18 of the shaft 12 projecting upwardly from the hub 4 forms an arbor for the axial reception of a wheel or the like, which may be rotatably received thereon for testing. Figures 1 and 2 illustrate alternate methods of mounting different types of conventional automobile wheels on the arbor 18 for testing.

Figure 1 illustrates the method of mounting a disc type wheel 19 which has been removed from its hub. For this type of wheel a disc-like adapter plate 20 is provided, which is axially bored so that it can slide over the arbor 18 into position to rest upon the shoulder 13 of the shaft 12. The adapter plate is provided with a series of tapped recesses 21 corresponding to the similar holes provided in the wheel 19, and the wheel is held in position on the adapter plate by means of cap screws 22 passed through the holes in the wheel and screwed into the recesses 21 of the adapter plate. It will be understood that while only one adapter plate is necessary for mounting the wheel, it may be desirable to provide several of such plates having different arrangements of tapped recesses 21 so as to provide a sufficient variety of patterns of these recesses to fit the various types of wheels which might be required to be tested.

Where the wheel assembly includes a hub, as in the case of the wheel 19a illustrated in Figure 2, it may be positioned on the arbor by means of a pair of centering cones 23 and 24 provided with smooth bores to permit them to slide over the arbor. In mounting such a wheel for testing, the lower cone is slipped over the arbor into the position illustrated, where it rests against the shoulder 13 on the shaft 12. The wheel is then placed in position with its hub 25 fitted over the lower centering cone and the upper cone is slipped onto the arbor into engagement with the upper end of the wheel hub, which properly centers the wheel in testing position. The wheel may then be secured firmly in position on the arbor for rotation thereabout by means of a jam nut 26 which may be screwed down directly against the upper cone 24, or a thrust bearing 27 may be inserted between them if desired.

It will be apparent that if the wheel, after being mounted in testing position as illustrated in Figures 1 and 2, is unbalanced, the shaft 12 will be caused to swing out of the vertical to one side or the other, depending upon which are the light and heavy sides of the wheel. In order to indicate deviation of the pendulum shaft from the vertical, an indicator arm 28 is provided, which is secured at its upper end to an extension of one of the trunnion shafts 10 for oscillation therewith, and projects downwardly behind the pendulum shaft and parallel therewith. The lower portion of the indicator arm is forked to provide a pair of pointers 29—29 which cooperate with a scale device 30 adjustably mounted upon the pedestal 2. The scale 30 is provided at its opposite ends with outwardly projecting ears or tabs 31 which, as illustrated, are provided with one or more graduations or gauge marks 32 for cooperation with the outer edges of the pointers 29—29 to indicate deviation of the shaft 12 from its normal vertical position. The scale may be adjustably mounted on the pedestal 2 by means of cap screws 33 passing through slots 34 in the scale and screwed into suitable tapped recesses on a squared face of the pedestal. The adjustable mounting of the scale makes it unnecessary to level the tester other than in an approximate way, so that the tester may be set up in any convenient place, and any out of level condition may be compensated for simply by adjusting the scale to bring its graduations into neutral position relative to the pointer. The purpose of providing the double indicator arms on the indicator shaft is to permit readings to be taken readily from either side of the apparatus.

Figure 3:
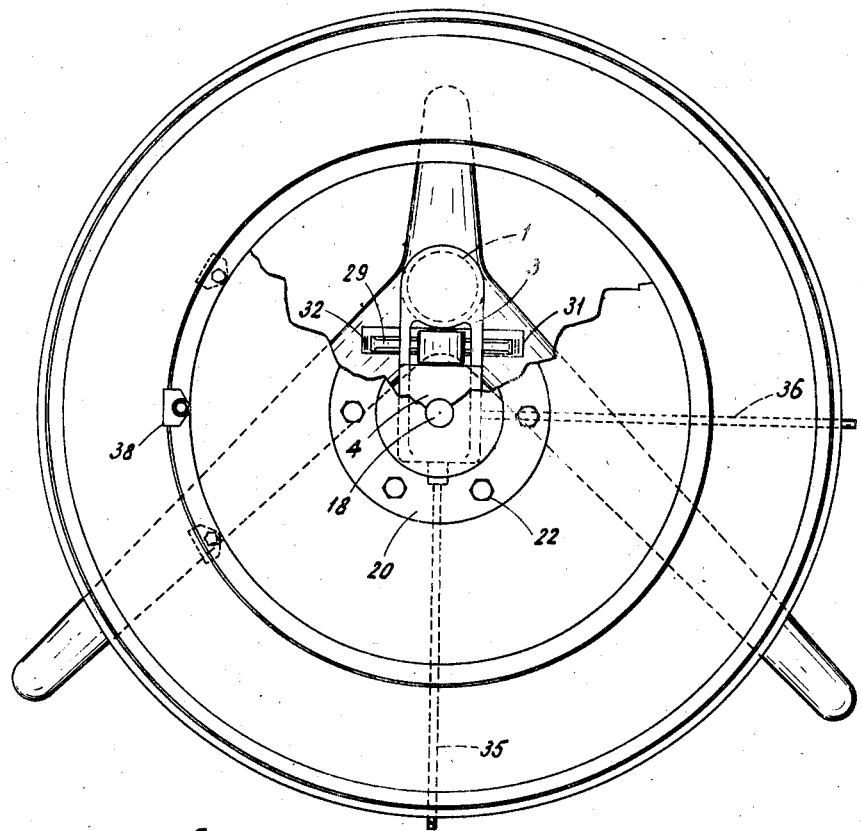
Figure 3 is a plan view of the apparatus illustrated in Figure 1 with a portion of the wheel broken away to expose certain structural details of the apparatus.
Figure 4:
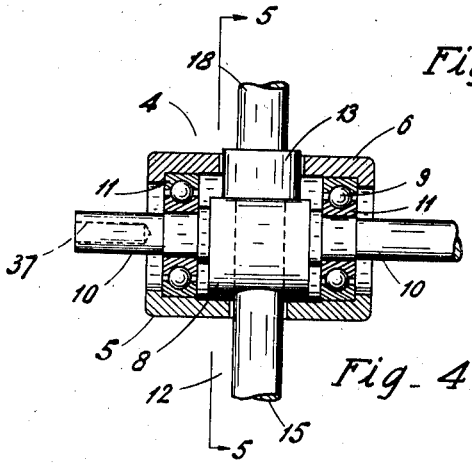
Figure 4 is a longitudinal sectional view taken through the journal housing illustrating the manner of mounting the wheel supporting shaft.
Figure 5:
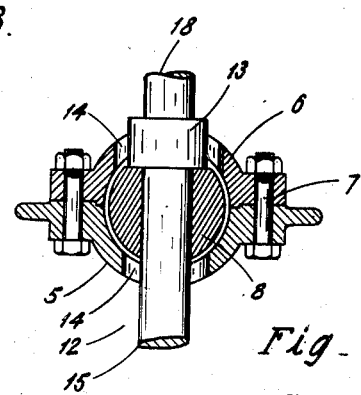
Figure 5 is a transverse section of the mechanism illustrated in Figure 4 taken along the line 5—5 of the latter figure.

In order to facilitate rapid and accurate manipulation of the apparatus, a pair of horizontally extending gauge arms 35 and 36 are provided, the former being secured into a tapped recess 37 in the end of one of the trunnion shafts, and the latter being secured to the lower journal housing section 5. These gauge arms are of sufficient length to project beyond the periphery of the largest wheel which might be tested and, as best seen in Figure 3, are arranged 90 degrees apart and would, if extended, intersect the shaft 12 on its center line.

In the operation of the apparatus thus far described the wheel to be tested is rotatably mounted upon the arbor 18 either by the use of an adapter plate as illustrated in Figure 1, or by centering cones as illustrated in Figure 2, depending upon the type of wheel being tested. The counterpoise 16 is then screwed up or down along the pendulum portion 15 of the shaft 12 in accordance with the weight of the wheel being tested in order to maintain the center of gravity of the assemblage slightly below the rotative axis of the shaft, since if the counterpoise is adjusted so that the center of gravity is above the axis of rotation the wheel being tested would simply tip over to one side and stay there. It will be apparent that the degree of sensitivity of the device may be varied as desired by the position of the counterpoise, and it may be said that it has been demonstrated in actual operation that the position of the counterpoise may be so adjusted that the balance of a wheel being tested can be accurately corrected to within two or three inch ounces.

The wheel to be tested is now rotated about the arbor 18 until the position of the indicator arm 28 indicates that the pendulum shaft is vertical, thus indicating that the wheel is in balanced position relative to the tester. In this position the outer periphery of the wheel or tire may be marked, as with chalk, at a point directly above the rod 35. The wheel is then turned through an angle of 90 degrees, this being a simple matter since the operator can quickly turn the wheel so as to position the chalk mark directly above the other gauge arm 36. If the wheel is correctly balanced the change in its position by rotating the same through 90 degrees will not affect the vertical position of the shaft 12 as indicated by the indicator arm 28. However, if the wheel is unbalanced the point at which the tire has been marked will be either the light or the heavy side of the wheel, and when rotated through 90 degrees will, accordingly, tip to one side or the other depending upon which is the heavy side, the amount of tilt being indicated by the indicator arm 28.

It may be stated here that while the gauging arms 35 and 36 are of considerable assistance for rapid and accurate manipulation of the apparatus, they may be dispensed with of course, if desired, in which event the point of unbalance on the wheel may be determined by rotating the wheel until the indicator 29 shows the greatest deflection from the vertical, at which point the heavy and light points of the wheel will be in the plane of movement of the shaft 12.

After positioning the wheel by either of the methods described, the operator may now balance it in any suitable manner. For example, wheel balancing weights 38, such as illustrated in Figures 7 and 8 may be employed for the purpose. One of these weights may be laid on the wheel adjacent its rim at a point directly in line with the marked spot on the tire on the light side. If this does not bring the wheel into balance, as indicated by the indicator arm 28, a second weight may be added and the two weights shifted circumferentially around the wheel in opposite directions to positions where they cause the wheel to be balanced, such as indicated in dotted lines on Figure 3. By deflating the tire the weights may then be installed on the wheel simply by hooking them over the flange of the wheel rim and securing them in position by means of the set screw 39. The wheel will now be found to be correctly balanced and is ready for reinstallation on the vehicle upon inflating the tire.

Figure 9:
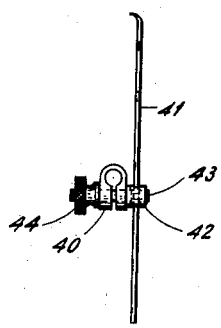
Figure 9 is an end view of the run-out gauge.

A check for run-out of the wheel may be made before removing it from the tester by means of the run-out gauge illustrated in Figures 2 and 9. This device comprises a split clamp 40 which may be slidably mounted on the rod 35 and carries a hooked gauge 41 which projects through a bore in a boss 42 on the clamp and is held in position by a slotted bolt 43 which passes transversely through the collar and may be tightened by means of a thumb nut 44 secured upon the opposite end of the bolt. To test for run-out the gauge may be adjusted in position as illustrated in Figure 2 on the arm 35, and the wheel is then revolved about the arbor 18, whereupon any warped condition of the wheel will become apparent by the consequent variation in spacing between the revolving wheel and the end of the gauge. In this connection, it will be observed that since the arm 35 is secured to the hub 8 for rotation therewith, the accuracy of the run-out gauge will not be affected by any unbalanced condition of the wheel.

Although I have described the invention as used for testing balance and run-out of vehicle wheels, obviously it may also be used for testing various other articles if desired, and the term wheel as used herein is intended to be inclusive thereof. It will also be understood that while the particular form of apparatus illustrated and described herein represents a preferred embodiment of the invention, various changes and modifications may be resorted to without departing from the spirit of the invention, and I deem myself entitled to all such modifications, variations and uses as fall within the scope of the claims appended hereto.

Having now described my invention and in what manner the same may be used, what I claim as new and desire to protect by Letters Patent is:

1. In a balance testing device, a standard, a pendulum, means journalling said pendulum on said standard for titling movement about a horizontal axis, a forked pointer at the lower end of said pendulum with the respective forks thereof extending to opposite sides of the axis of said pendulum, and a scale on said standard for cooperation with each of said forks, said scales being spaced apart whereby at least one scale is visible from any position about said device.

2. The method of balancing a wheel which comprises supporting the wheel for bodily tilting movement about a horizontal axis and for axial rotation about an axis intersecting said horizontal axis, shifting the center of gravity of the wheel and its supporting means to a location slightly below said horizontal axis, rotating the wheel to a point such that the center of gravity lies in the vertical plane inclusive of said horizontal axis, then rotating the wheel a quarter revolution to place the center of gravity thereof in a plane perpendicular to said horizontal axis whereby an unbalanced wheel will tilt about said horizontal axis, and placing weight on the wheel in such manner that the center of mass of such added weight lies in a plane at right angles to said horizontal axis until the rotational axis of the wheel is upright.

3. The method of balancing a wheel which comprises supporting the wheel for bodily tilting movement about a horizontal axis and for axial rotation about an axis intersecting said horizontal axis, rotating the wheel to a point such that the center of gravity lies in the vertical plane inclusive of said horizontal axis, then rotating the wheel a quarter revolution to place the center of gravity thereof in a plane perpendicular to said horizontal axis whereby an unbalanced wheel will tilt about said horizontal axis, and placing weight on the wheel in such manner that the center of mass of such added weight lies in a plane at right angles to said horizontal axis until the rotational axis of the wheel is upright.

JAMES W. MORSE.